C. E. SCHINDLER.
FISHING APPLIANCE.
APPLICATION FILED JUNE 5, 1909.
963,654.
Patented July 5, 1910.
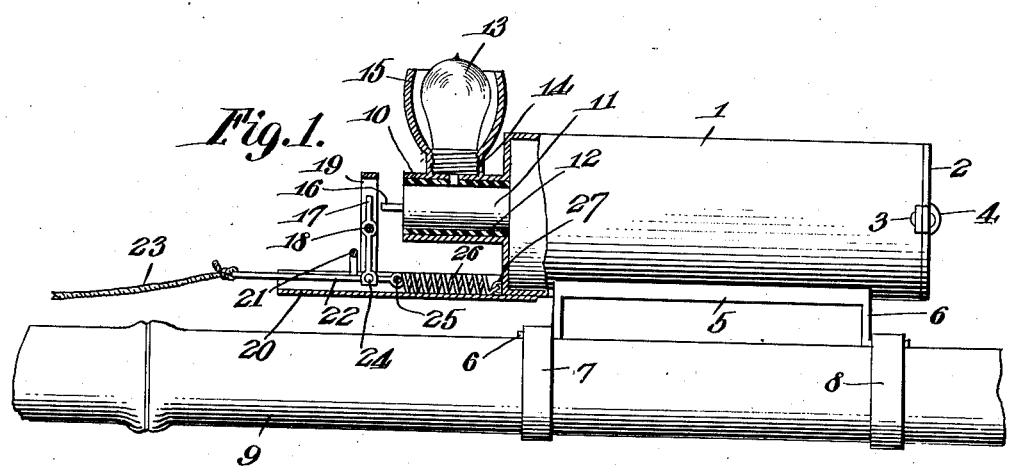
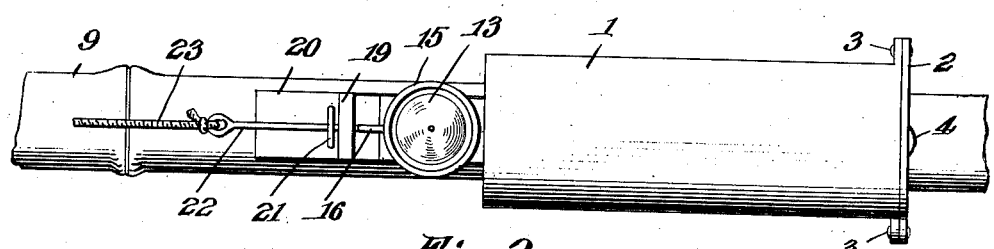
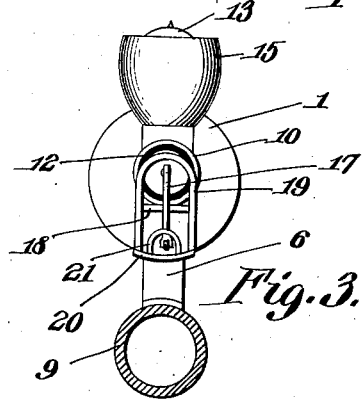
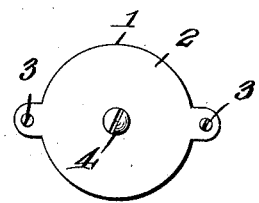
Witnesses
Inventor
Charles E. Schindler,
By Victor J. Evans.
Attorney

UNITED STATES PATENT OFFICE.

CHARLES E. SCHINDLER, OF COLDWATER, OHIO.

FISHING APPLIANCE.

963,654.

Specification of Letters Patent.

Patented July 5, 1910.

Application filed June 5, 1909. Serial No. 500,381.

*To all whom it may concern:*

Be it known that I, CHARLES E. SCHINDLER, a citizen of the United States, residing at Coldwater, in the county of Mercer and State of Ohio, have invented new and useful Improvements in Fishing Appliances, of which the following is a specification.

This invention relates to a fishing appliance designed for attachment to a fishing rod and to be employed particularly in still water fishing.

The object of the invention is to provide an electrical appliance which will operate, upon a pull upon the line when the fish nibbles at the bait or takes the hook, to give an electric signal of a nature to indicate the character of the bite or strike by which the fisherman will be advised that his attention is required.

A further object of the invention is to provide a device of this character which may be applied and clamped in position upon the reel seat of the rod by the usual reel holding means, and which includes an electric lamp adapted to give one or more flashes or glow continuously to indicate the character of the bite and thereby enable fishing to be carried on at night without the strain upon the eyes incident to the use of corks or floats.

The invention consists of the features of construction, combination and arrangement of parts hereinafter fully described and claimed, reference being had to the accompanying drawing, in which:—

Figure 1 is a side elevation of the device applied to the reel seat of a rod, a portion of which is shown, a part of said device appearing in section to better illustrate the construction. Fig. 2 is a top plan view of the same. Fig. 3 is a cross section through the rod showing the indicating appliance in front elevation. Fig. 4 is a rear elevation of the battery casing.

Referring to the drawing, 1 designates a dry battery casing of suitable construction to contain the battery elements and to be applied in position upon the rod, said casing having a rear closure plate 2 in order to afford access thereto for the purpose of renewing the battery elements when occasion requires. This closure plate is secured in position by fastening screws 3 and has extending therethrough a screw 4 for electrically connecting said casing with one of the battery elements. It has not been deemed necessary to show the interior construction of the battery in detail, as the internal construction may conform to that of any of the dry batteries in common use. The casing is fastened to a bar 5 having angularly bent engaging members 6 providing terminal tongues which are adapted to engage the fixed holding band 7 and sliding clamping band or sleeve 8 arranged as usual upon the reel seat of the butt section of the rod 9, so that the device may be applied in position in place of the reel. The forward end of the casing is provided with a tubular extension 10 which receives a projecting portion 11 of the other element of the battery, from which it is electrically insulated by a sleeve 12 of non-conducting material. This tube supports the electric signal 13 shown in the present instance in the form of an incandescent lamp held within a socket 14 fixed to the tube, which socket is provided with a shield 15 partially inclosing the lamp and adapted to protect the same against injury.

The device is secured in position upon the rod in the manner shown in Figs. 1, 2 and 3, and the projecting portion of the battery element 11 is provided with a contact terminal 16 adapted to be engaged by the upper end of a switch member 17 intermediately pivoted upon a cross pin 18 fixed in the side portions of an inverted U-shaped bracket or yoke 19. This bracket or yoke is carried by a concavo-convex supporting arm 20 fixed to and projecting from the front of the casing, and which also carries a U-shaped guide member 21. A rod or stem 22 is movable through said guide 21 and provided with an eye or other suitable means at its forward end for connection with the rear end of the fishing line 23. The stem is pivotally connected with the lower end of the switch bar, as at 24 and is formed at its rear end with an eye 25 for connection with the forward end of a coiled contractile spring 26, the rear end of which is connected with the eye 27 on the casing. The function of the spring is to take up the slack in the line, to maintain the same taut to the desired degree, to permit outward movement of the line when the fish bites at the bait or takes the hook, and to return the parts to normal position in the event that the fish is merely nibbling and releases the hook.

It will be understood that the switch is connected with one of the battery elements through the casing, stem and spring, and that upon engagement of said switch with the contact 7 extending from the other battery element, the battery circuit will be completed to send a current through the filament of the lamp, by which the latter will flash or glow. After the line is cast out, the operator may leave the rod unattended in case he is fishing with several lines, or may hold the rod or place it within convenient position so that he can observe the lamp 13. If the fish should nibble at the baited hook one or more times, the successive pulls upon the line will be transmitted to the stem 22 which will move forward against the yielding resistance of the spring 26, which at the end of each pull will retract the stem. By this means the switch member 17 will be on each nibble and release of the hook by the fish, alternately thrown into and out of engagement with the contact 16, thus causing the lamp to flash a corresponding number of times and indicating to the fisherman the nature of the bite or strike upon the hook. If, however, the fish should pull down the hook to any appreciable degree or attempt to run off with the bait, the pull upon the line will cause the switch member to be held in constant engagement with the contact so that the lamp will continuously glow, indicating to the fisherman that the fish is hooked and proper measures should be taken to land it.

By means of my invention the use of bobs or floats may be dispensed with, and the necessity of employing a lamp to observe the same at night avoided and the constant strain of the eyes in watching the float under such conditions obviated. Furthermore, the exact nature of the bite is indicated, so that the fisherman may pull in the line at the proper time. By also adapting the device to be mounted upon the reel seat of the rod, the appliance may be easily and conveniently held in position and maintained in proper position relative to the line to secure a nicety of action, as will be readily understood. Compactness is also secured, as the device will consume but little more space than an ordinary reel, so that it may be carried in the pocket or packed in close compass in a kit.

While I have in the present instance shown a lamp or visual signal, it will be understood that its equivalent in the form of a bell or other aural signal may be employed.

I claim:—

1. A fishing appliance, comprising a casing having a forwardly extending arm, a battery inclosed within the casing and having a projecting contact, a yoke carried by the arm, a transverse pivot pin supported by the yoke, a switch pivotally mounted on said pin for movement into and out of engagement with said contact, a guide upon the arm, a stem movable longitudinally of the arm and through said guide, and a contractile spring connecting one end of said stem with the casing, the opposite end of the stem being adapted for attachment to the line.

2. A fishing appliance, comprising a casing having a supporting arm and a tubular portion projecting therefrom, a battery disposed within and having one of its terminals electrically connected with the casing and having its other terminal projecting into and insulated from said tubular portion and provided with a contact, a signal supported by said tubular portion, a yoke carried by the arm, a guide also carried by the arm, a switch pivotally mounted upon the yoke to engage said contact, a stem pivotally connected with the switch and movable through the guide, said stem being adapted for connection at one end with a fishing line, and a contractile spring connecting the other end of said stem with the casing.

In testimony whereof I affix my signature in presence of two witnesses.

CHARLES E. SCHINDLER.

Witnesses:
LEWIS WESTFALL,
ALVA SMITH.